United States Patent
Scott

(10) Patent No.: US 10,368,489 B2
(45) Date of Patent: Aug. 6, 2019

(54) SEED HARVESTER AND RELATED METHODS

(71) Applicant: Bridgestone Corporation, Tokyo (JP)

(72) Inventor: Jody Scott, San Tan Valley, AZ (US)

( * ) Notice: Subject to any disclaimer, the term of this patent is extended or adjusted under 35 U.S.C. 154(b) by 96 days.

(21) Appl. No.: 14/972,155

(22) Filed: Dec. 17, 2015

(65) Prior Publication Data

US 2016/0174464 A1    Jun. 23, 2016

Related U.S. Application Data

(60) Provisional application No. 62/094,099, filed on Dec. 19, 2014.

(51) Int. Cl.
*A01D 45/30*    (2006.01)

(52) U.S. Cl.
CPC ................... *A01D 45/30* (2013.01)

(58) Field of Classification Search
CPC ................ A01D 45/30; A01D 93/00
USPC .......................... 56/126–130, 329
See application file for complete search history.

(56) References Cited

U.S. PATENT DOCUMENTS

| | | | | |
|---|---|---|---|---|
| 18,628 A * | 11/1857 | Cox et al. | ........... | A01D 45/30 56/128 |
| 32,416 A * | 5/1861 | Decker | ........... | A01D 41/08 56/129 |
| 195,424 A * | 9/1877 | Walton | ........... | A01D 45/30 56/128 |
| 371,372 A * | 10/1887 | Savage | ........... | A01D 45/22 56/130 |
| 2,656,667 A * | 10/1953 | Smith | ........... | A01D 45/30 56/126 |
| 3,521,435 A * | 7/1970 | Furuseth | ........... | A01D 45/30 56/128 |
| 4,276,738 A * | 7/1981 | Ferraro | ........... | A01D 46/02 56/130 |
| 5,287,685 A | 2/1994 | Morgan | | |
| 6,564,536 B1 * | 5/2003 | Hoffer | ........... | A01D 75/02 56/119 |
| 7,730,707 B2 * | 6/2010 | Pietricola | ........... | A01D 41/148 56/221 |

(Continued)

FOREIGN PATENT DOCUMENTS

| | | |
|---|---|---|
| AU | 2003770 A | 3/1972 |
| CN | 101828471 A | 9/2010 |
| CN | 201718225 U | 1/2011 |

*Primary Examiner* — John G Weiss
(74) *Attorney, Agent, or Firm* — Meredith E. Hooker; Jenny L. Sheaffer

(57) ABSTRACT

A seed harvester suitable for removing and collecting seed from plants. The seed harvester includes one or more seed collection assemblies. Each seed collection assembly may include a frame body extending between a forward portion and a rearward portion along a longitudinal axis, at least one seed collection bin supported by the frame body, a support structure having a first end pivotally attached to the frame body and a second end distal from the frame body; and a plurality of fixed projections for contacting the branches to dislodge seeds. The plurality of projections may be attached to the second end of the support structure and extending downward toward the frame body and the at least one seed collection bin may be positioned to receive dislodged seed that fall downward by gravity.

19 Claims, 4 Drawing Sheets

(56) References Cited

U.S. PATENT DOCUMENTS

2016/0120124 A1\* 5/2016 De Kleine ........... A01D 46/264
56/329

\* cited by examiner

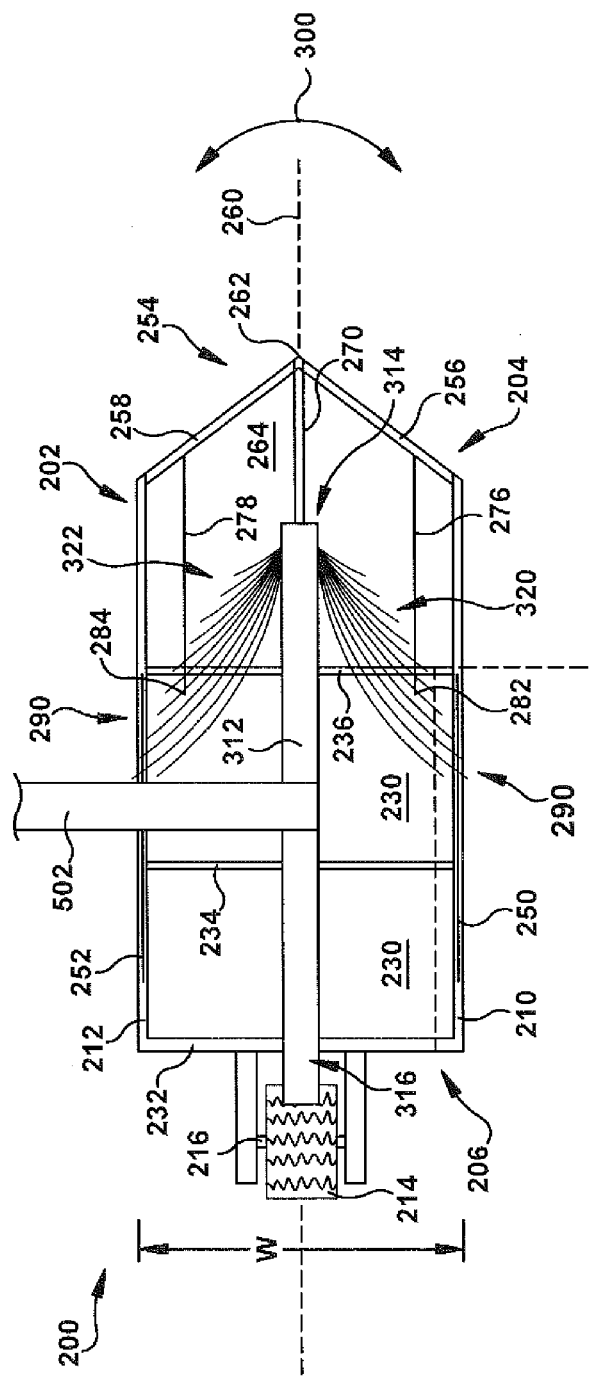
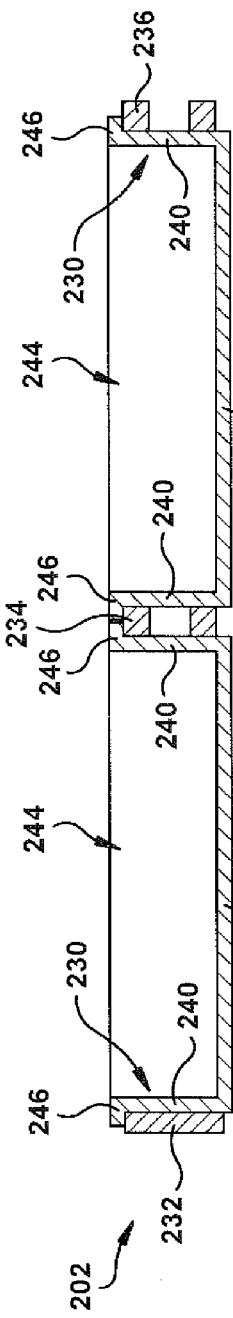

SEED HARVESTER AND RELATED METHODS

CROSS-REFERENCE TO RELATED APPLICATION

This application claims priority to and any other benefit of U.S. Provisional Patent Application Ser. No. 62/094,099 filed Dec. 19, 2014, and entitled "SEED HARVESTER AND RELATED METHODS," the entire disclosure of which is incorporated by reference herein.

FIELD OF THE INVENTION

The present application generally relates to seed harvesters and, more particularly, to seed harvesters including at least one projection for dislodging seeds from a plant and at least one seed collection bin for collecting the dislodged seeds.

BACKGROUND OF THE INVENTION

In agriculture and gardening, seed saving is the practice of saving seeds from plants, such as shrubs, grain, herbs, vegetables, and flowers, for use in replanting the harvested plants and crops from year to year. Harvesting seeds from live plants can be laborious and can risk harming the plant. Efficient removal of the seeds from plants without damaging the plant is preferred.

SUMMARY OF THE INVENTION

A first exemplary embodiment is directed to a seed harvester suitable for removing and collecting seed from plants. The seed harvester includes one or more seed collection assemblies. Each seed collection assembly may include a frame body extending between a forward portion and a rearward portion along a longitudinal axis, at least one seed collection bin supported by the frame body, a support structure having a first end pivotally attached to the frame body and a second end distal from the frame body; and a plurality of fixed projections for contacting plant branches to dislodge seeds. The plurality of projections may be attached to the second end of the support structure and extend downward toward the frame body and the at least one seed collection bin may be positioned to received dislodged seeds.

BRIEF DESCRIPTION OF THE DRAWINGS

Features and advantages of the present invention will become apparent to those of ordinary skill in the art to which the invention pertains from a reading of the following description together with the accompanying drawings, in which:

FIG. 3 is a top view of the seed collection assembly of FIG. 2;

FIG. 4 is a cross sectional side view of the seed collection assembly of FIG. 2;

DETAILED DESCRIPTION

As described herein, when one or more components are described as being connected, joined, affixed, coupled, attached, or otherwise interconnected, such interconnection may be direct as between the components or may be indirect such as through the use of one or more intermediary components. Also as described herein, reference to a "member," "component," or "portion" shall not be limited to a single structural member, component, or element but can include an assembly of components, members or elements. "Physical communication" as used herein, includes but is not limited to connecting, affixing, joining, attaching, fixing, fastening, placing in contact two or more components, elements, assemblies, portions or parts. Physical communication between two or more components, etc., can be direct or indirect such as through the use of one or more intermediary components and may be intermittent or continuous.

Figure 1:
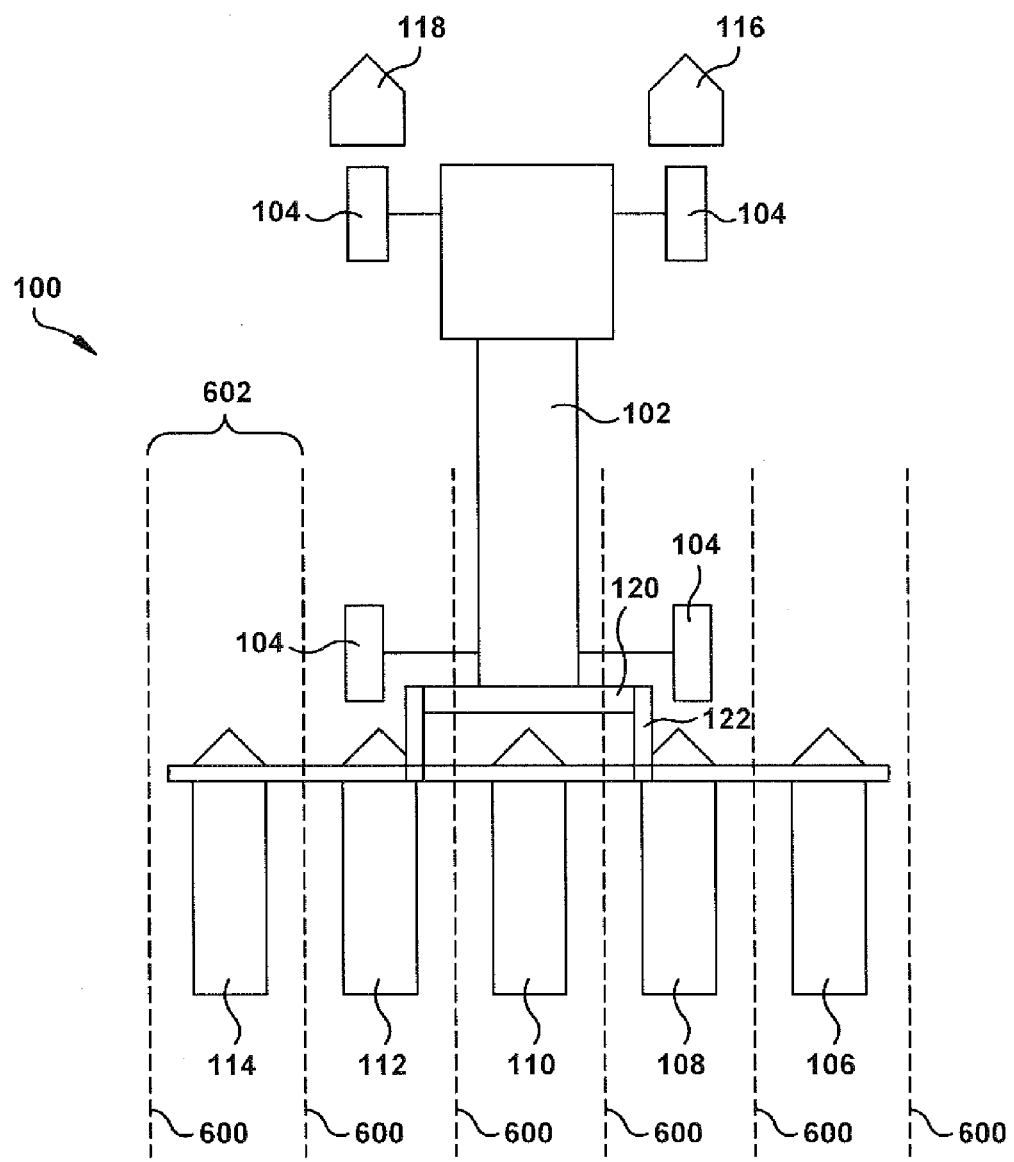
FIG. 1 is a schematic illustration of an exemplary embodiment of a seed harvester.

FIG. 1 illustrates a schematic representation of an exemplary embodiment of a seed harvester 100 for dislodging seeds from a plant by agitating the plant and collecting the dislodged seeds that fall from the plant. The seed harvester 100 can be used to dislodge and collect seeds from a variety of plants. For example, the seed harvester 100 may be used to harvest seeds from certain non-Hevea plants such as guayule shrubs (*Parthenium argentatum*).

While the exemplary embodiment of the seed harvester 100 of FIG. 1 is illustrated as including a motorized vehicle 102 with four wheels 104, such as a farm tractor, and having five rear-mounted or attached seed collection assemblies 106, 108, 110, 112, 114 and two forward mounted seed collection assemblies 116, 118, the seed harvester 100 may be configured in a variety of ways including various configurations of the motorized vehicle and the collection assemblies. Any configuration capable of dislodging seeds from a plant by agitating the plant and collecting the dislodged seeds as they fall from the plant may be used. For example, each collection assembly may be integral with the vehicle or may be removably attached and pulled behind or pushed ahead of the vehicle. In FIG. 1, for example, each of the five rear mounted seed collection assemblies 106, 108, 110, 112, and 114 may be attached to a fixed structure 120 on the vehicle 102 by one or more linkages 122. Further, each collection assembly may function independently such that it may be used with use of a separate motorized vehicle. For example, each collection assembly may be self-propelled, such as in a similar manner to self-propelled gasoline or electrically powered lawn mowers or other self-propelled vehicles, or may be propelled manually. Still further, the number of collection assemblies may vary in different embodiments. For example, the seed harvester may have more or less than five (e.g., two, three, four, six, seven, eight, or nine, etc.) rear mounted collection assemblies and more or less than two forward mounted collection assemblies.

Figure 2:
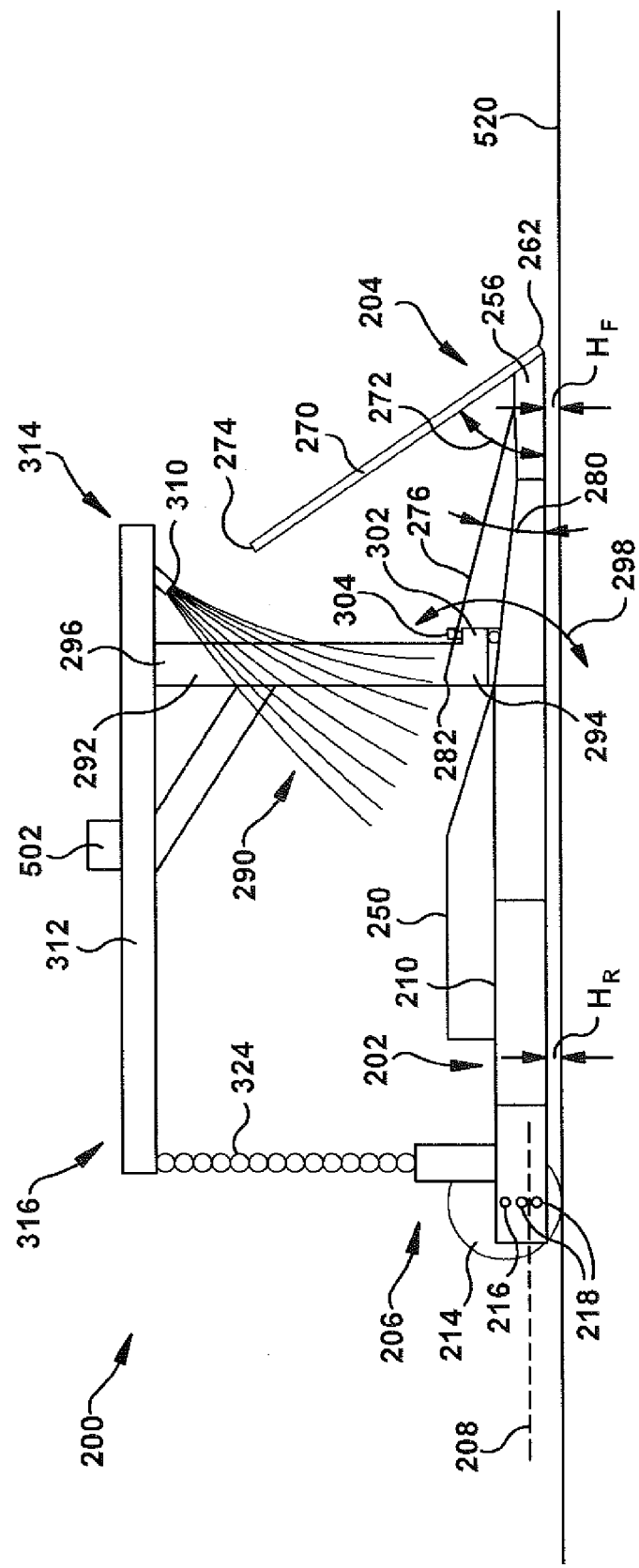
FIG. 2 is side view of an exemplary embodiment of a seed collection assembly of the seed harvester of FIG. 1.

FIGS. 2 and 3 illustrate an exemplary embodiment a rear mounted seed collection assembly 200. The rear mounted collection assembly 200 may be configured in a variety of ways. Any collection assembly capable of dislodging seeds from a plant by agitating the plant and collecting the dislodged seeds that fall from the plant may be used. In the exemplary embodiment, the collection assembly 200 includes a frame body 202 having a forward portion 204, a rearward 206 portion, and a longitudinal axis 208. The frame body 202 includes a first side rail 210 extending between the forward portion 204 and the rearward portion 206 and a second side rail 212 parallel to the first side rail 210 and extending between the forward portion 204 and the rearward portion 206. The distance from the first side rail 210 to the second side rail 212 defines a width W of the frame body 202. The frame body 202 may be constructed of any suitable materials such as for example, aluminum, steel, cast iron, wood, plastic, or other suitable materials.

The rearward portion 206 includes at least one wheel 214 rotatably mounted to the frame body 202. In the depicted embodiment, the at least one wheel 214 is a single wheel mounted along a central axle 216, but in other embodiments, more than one wheel may be used and the at least one wheel 214 may be mounted other than along the central axle 216. The vertical position of the axle 216 relative to the frame body 202 may be adjusted to raise and lower the rearward portion of the frame body relative to the ground. This can be accomplished by providing multiple vertical locations 218 on the frame body 202 to which the axle 216 may mount.

The frame body 202 is configured to form or support one or more seed collection bins. The seed collection bins may be formed in a variety of ways. For example, in some embodiment, the frame body 202 may include walls or dividers forming one or more collection bins integral to the frame body, while in other embodiments, the frame body may provide support and house one or more (e.g., two, three, four, etc.) removable collection bins or a combination of integral and removable bins. In the exemplary embodiment of FIGS. 2 and 3, the collection assembly 200 includes two removable, generally rectangular seed collection bins 230 supported in by the frame body 202. In other embodiments, the seed collection assembly 200 may include more or less than two (e.g., one, three, four, etc.) removable collection bins 230 and the collection bins may be shaped other than rectangular. The removable collection bins 230 may be supported by the frame body 202 in a suitable manner. The removable collection bins (or integral collection bins) are generally positioned within the frame body of the harvester relatively low to (i.e., underneath at least a portion of the lower plant branches) and substantially parallel to the ground during operation of the harvester so as to allow dislodged seeds to fall into the bins.

Referring to FIGS. 3 and 4, in the exemplary embodiment, the frame body 202 includes a rear end rail 232, a first cross rail 234, and a second cross rail 236. The two collection bins 230 include four side walls 240 connected by a bottom wall 242 and includes an open end 244 opposite the bottom wall. Bottom wall 242 may be solid in certain embodiments and in other embodiments may be one of various configurations of non-solid (e.g., mesh, rods, etc.). Surrounding at least a portion of the perimeter of the open end 244 is a lip 246 extending outward to engage the frame body 202 for supporting the collection bins 230. In the illustrated embodiment, the lip 246 of a first of the collection bins 230 engages on the rear end rail 232, the first cross rail 234, the first side rail 210 and the second side rail 212 such that the frame body 202 supports the collection bin with the open end 244 facing upward. The lip 248 of a second of the collection bins 230 engages on the first cross rail 234, the second cross rail 236, the first side rail 210, and the second side rail 212 such that the frame body 202 supports the collection bin with the open end 244 facing upward. Other configurations are possible to support or form the collection bins, especially when the collection bins are removable; for example, the bottom wall 242 may be entirely missing if other components such as the side walls 240 provide sufficient support to hold the bins in place via a lip, snap, lock or other releasable connection.

Along each of the first side rail 210 and the second side rail 212 may be a first guard rail 250 and a second guard rail 252. The first guard rail 250 and the second guard rail 252 may include a tapered forward portion and help to deflect plant branches from knocking collected seeds from the seed collection bins 230 during collection.

The forward portion 204 of the frame body 202 may be formed into a wedge or tapered nose 254. In particular, the forward portion 204 may include a first angled side rail 256 extending from the first side rail 210 and a second angled side rail 258 extending from the second side rail 212. In certain embodiments (e.g., as illustrated), the first angled side rail 256 is attached to the second angled side rail 258 generally at a central axis 260 to form a tip 262; in other embodiments the forward portion 204 has other shapes and may or may not comprise a first angled side rail 256 and a second angled side rail 258. In the illustrated embodiment, the second cross rail 236, the first angled side rail 256, and the second angled side rail 258 form an integrated seed collection bin 264 at the front portion 204. In other embodiments, the second cross rail 236, the first angled side rail 256, and the second angled side rail 258 may support a removable collection bin similar to how the lip 246 of a first of the collection bins 230 is supported on the rear end rail 232, the first cross rail 234, the first side rail 210 and the second side rail 212.

The seed collection assembly 202 includes one or more structures for contacting plants as the seed collection assembly moves or is moved adjacent to the plants. The structures are designed to contact the plants to cause sufficient agitation to dislodge the seeds of the plant, while causing little, if any, damage to the plant such as by breaking branches. During collection, seeds will fall downward by gravity and into the collection bins. The one or more structures for contacting plants may be configured in a variety of ways. Any structure capable of contacting plants to cause sufficient agitation to dislodge the seeds of the plant such that the seeds fall downward by gravity, while causing little, if any, damage to the plant, may be used. In the exemplary embodiment, the seed collection assembly 200 includes one or more projections extending from the forward portion 204. In certain embodiments, the one or more projections that extend from the forward portion 204 extend generally rearward so as to limit or avoid damage to the plant branches during operation. In particular, the front portion 204 includes a first projection 270 extending from the tip 262 upward and angled toward the rearward portion 206 at an angle 272 and generally along the central axis 260. The first projection 260 is generally rod-like and includes a distal end 274.

The forward portion 204 also includes a second projection 276 and a third projection 278 extending from front portion 204 upward and angled toward the rearward portion 206 at an angle 280 generally lateral to and parallel to the central axis 260. The second and third projections 276, 278 are generally rod-like and include a distal ends 282, 284, respectively. In the illustrated embodiment, the first projection 270 has a larger diameter, a greater length, and extends at a larger angle 272 relative to the longitudinal axis 208 than the second and third projections 276, 278; however, other configurations of the projections 270, 276 and 278 are possible. In addition, in the illustrated embodiment, the second and third projections 276, 278 are substantially the same diameter and length, and extend at the same angle 280 as each other; however, in other embodiments the second and third projections 276, 278 may differ from each other in one or more of diameter, length and angle. Still further, in the illustrated embodiment, the second and third projections 276, 278 are substantially equidistant from and on opposite sides of the first projection 270; however, in other embodiments, the second and third projections 276, 278 may be positioned different distances from the first projection 270.

The exemplary embodiment of the seed collection assembly 200 also includes a plurality of projections 290 positioned above and extending downward toward the frame body 202 and generally rearward toward the rearward portion 206. In particular, the seed collection assembly 200 includes a vertical support member 292 having a first end 294 connected to the frame body 202 and a second end 296 distal from the frame body. In the exemplary embodiment, the vertical support member 292 is attached to the frame body 202 such that the frame body may pivot relative to the vertical support member both in an upward and downward direction (i.e. about the pitch axis) as shown by arrow 298 in FIG. 2 and in a side-to-side direction (i.e. about the yaw axis) as shown by arrow 300 in FIG. 3. In one exemplary embodiment, the frame body 202 may pivot to the right as much as about 15 degrees and to the left as much as about 15 degrees (or about 30 degrees total movement). In other embodiments, the frame body 202 may pivot more or less than as much as about 15 degrees in both directions. In certain embodiments, the frame body 202 does not pivot more than 90 degrees in either direction.

Figure 6:
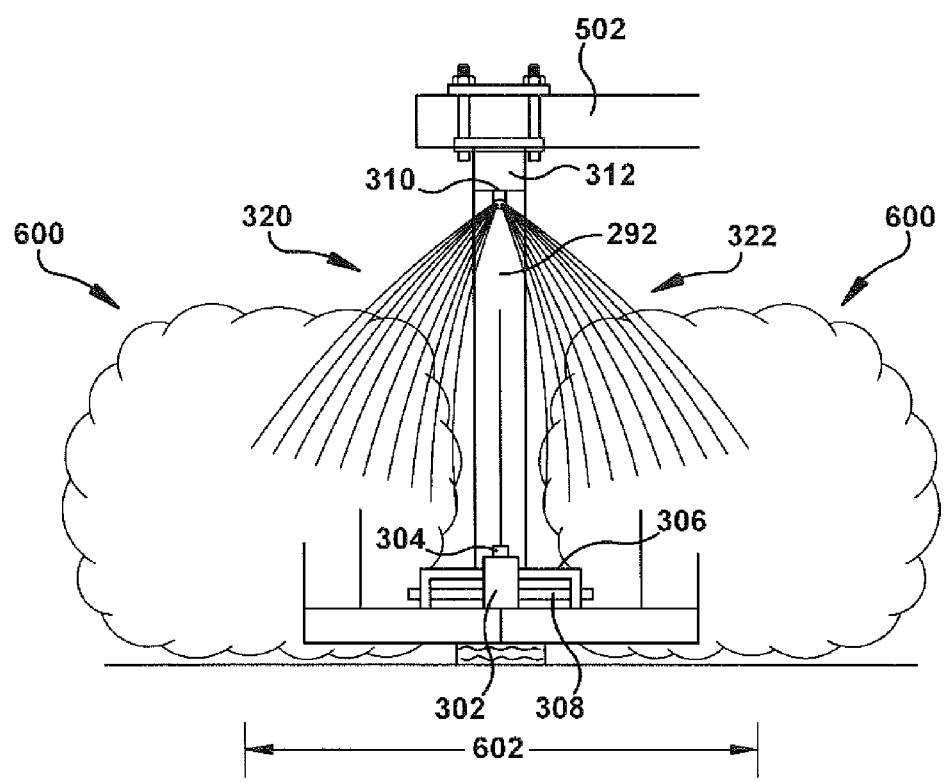
FIG. 6 is a front view of the seed collection assembly of FIG. 2 positioned between rows of plants during seed collection.

The vertical support member 292 may be connected to the frame body 202 in any suitable manner that allows at least up and down movement and in certain embodiments side-to-side pivotal movement. Referring to FIGS. 2 and 6, in the exemplary embodiment, the vertical support member 292 includes a vertical collar 302 that receives a fastener or pin 304 attached to the frame body 202 to allow side-to side pivotal movement. The frame body 202 also includes a bracket 306 that receives a fastener or pin 290 extending through the bracket and attached to the fastener or pin 304 to allow up and down pivotal movement of the frame body. Pivotal movement between the vertical support member 292 and the frame body 202, however, is not required.

The second end of the vertical support member 292 includes, or is attached to, an attachment point 310 for the plurality of projections 290. In the exemplary embodiment, a horizontal support member 312 is fixably attached to the vertical support member 292. The horizontal support member 312 extends along the central axis 260 and includes a first end 314 position toward the forward end 204 of the frame body 202 and a second end 316 positioned toward the rearward end 206 of the frame body. In the exemplary embodiment, the vertical support member 292 is fixably attached to the horizontal support member 312 near the first end 314 with a portion of the horizontal support member 312 extending forward of the vertical support member 292 to provide the attachment point 310 for the plurality of downward projections 290.

In the exemplary embodiment, the plurality of downward projections 290 include a first set of projections 320 and a second set of projections 322 substantially similar to the first set but positioned on the opposite side of the vertical support member 292. While two sets of projections 320 are illustrated, more or less than two sets (e.g., one, three, four, etc.) may be utilized in certain embodiments. The projections 290 can be formed in a variety of ways, including, but not limited to, different lengths, thicknesses, shapes, angles of extension, materials used, and number of projections. For example, the projections may be formed from any suitable material, including plastic, steel, aluminum, wood, or other suitable material. In some embodiments, the projections 290 are formed from a flexible plastic, thereby allowing the projections to flex somewhat without breaking.

In the exemplary embodiment, the first set and second set of projections 320, 322 attach to the attachment point 310 in any suitable manner. In certain embodiments, the first set and second set of projections 320, 322 attach to the same attachment point 310 and in other embodiments, they attach to separate attachment points. As the projections 290 extend downward and rearward, the projections fan out to form a broad surface for contacting the plant.

The horizontal support member 312 extends rearward such that the second end 316 is positioned over the rearward portion 206 of the frame body 202. An adjustable link 324, such as a chain, for example, connects the second end 316 to the rearward portion 206 of the frame body 202. While a chain is illustrated for the adjustable link 324, in other embodiments another type of adjustable connection is utilized such as spring, rope, telescoping member, etc. Any adjustable link that allows some relative movement between the second end 316 and the rearward portion 206 during operation but will lift the rearward portion once the forward portion 204 has been raised beyond a pre-determined amount may be used.

Figure 5:
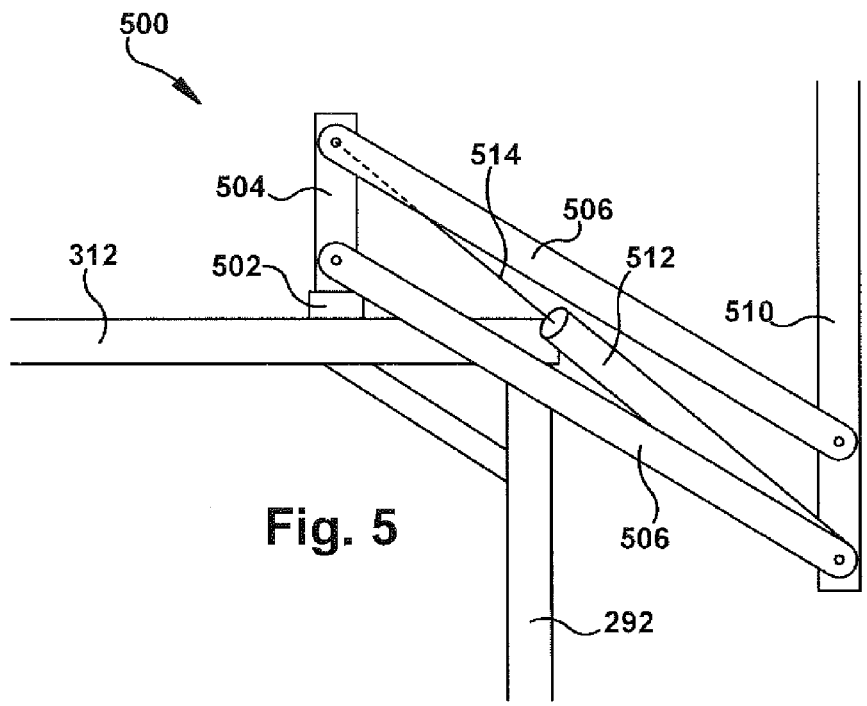
FIG. 5 is a partial side view of an exemplary embodiment of an attachment and lifting mechanism for attaching the seed collection assembly of FIG. 1 to a vehicle.

As indicated in FIG. 1, one or more seed collection assemblies 200 may be attached and pulled behind the motorized vehicle 102. The one or more seed collection assemblies 200 may be attached to the vehicle 102 in a variety of ways. Any attachment mechanism capable of attaching the one or more seed collection assemblies to the vehicle such that the vehicle may pull the assemblies behind the vehicle and adjacent to plants having seeds to be collected may be used. Referring to FIG. 5, an exemplary embodiment of an attachment mechanism 500 is shown. The attachment mechanism 500 may be configured in a variety of ways.

In the exemplary embodiment, the attachment mechanism 500 includes a horizontal support member 502 fixably attached and extending generally perpendicular to the horizontal support member 312 on the seed collection assemblies 200. The horizontal support member 502 includes one or more vertical support brackets 504 fixably attached to and extending upward from the horizontal support member 502. A pair of spaced apart, parallel links 506 are pivotably attached to each of the vehicle vertical support brackets 504 at one end and pivotably attached to a fixed structure 510 on the vehicle at the other end.

A power cylinder 512, such as a hydraulic or pneumatic powered cylinder, is attached between the fixed structure 510 and each vertical support bracket 504. The power cylinder 512 may be powered in any suitable way, such as for example, by the hydraulic system of the vehicle. The power cylinder 512 includes an extendable/retractable rod 514 and is arranged such that the extension of the rod pivots the parallel links 506 upward to raise the vertical support brackets 504 and the attached seed collection assemblies 200, and the retraction of the rod pivots the parallel links downward to lower the vertical support brackets and the attached seed collection assemblies. In this way, the height of the seed collection assemblies 200 relative to the ground 520 (FIG. 2) can be adjusted, including completely lifting the seed collection assemblies off of the ground. In one exemplary embodiment, the parallel links 506 can be pivoted upward, relative to the ground 520, as much as about 45 degrees and can be pivoted downward, relative to the ground 520, as much as about 40 degrees. As explained in more detail below, configuring the seed assemblies to be pivotable and adjustable allows them to be raised or lower, as necessary, during operation or during movement to and from a field.

As shown in FIG. 1, the seed harvester 100 may optionally include one or more forward mounted seed collection assemblies 116, 118. The forward mounted seed collection assemblies may be substantially similar to the rearward mounted seed collection assemblies 106, 108, 110, 112, 114 or may differ. For example, in an exemplary embodiment, the first forward mounted seed collection assembly 116 is mounted in front of a front wheel 104 of the vehicle 102 and the second forward mounted seed collection assembly 118 is mounted in front of another front wheel 104. In other embodiments, more or less than two forward mounted seed collection assemblies may be used. Generally, the forward mounted seed collection assemblies provide some protection to the front wheels of the vehicle 102 and also collect a certain amount of seeds.

Furthermore, the one or more forward mounted seed collection assemblies 116, 118 may differ from the rearward mounted seed collection assemblies 106, 108, 110, 112, 114 in that the one or more forward mounted seed collection assemblies may only include a wedge portion similar to the forward portion in the rearward mounted seed collection assemblies. In other words, the one or more forward mounted seed collection assemblies 116, 118 may form a wedge with a cross rail and first and second angled side rails forming a seed collection bin. Each of the one or more forward mounted seed collection assemblies 116, 118 may include one or more projections extending upward and angled rearward for coming into contacting with the plants and dislodging seeds into the seed collection bin.

Referring to FIGS. 1 and 6, in use, the seed collection assembly 200 may be driven other otherwise moved between rows of plants (depicted by dashed lines 600 in FIG. 1). In the illustrated embodiment in FIG. 6, the plants are guayule shrubs arranged in rows. The rows 600 are spaced apart a width 602 and generally grow out such that the branches of the guayule shrubs in adjacent rows 600 generally cover the space between the rows. The width W (FIG. 3) of the frame body 202 of the seed collection assembly 200 and the length of the plurality of projections can be configured to be suitable for a particular row spacing 602 and plant type. For example, for a row spacing 602 of about 40 inches, the frame body width W may be in the range of about 15 inches to about 25 inches. In another embodiment, the frame body width W may be about 17.5 inches.

During seed collection, the frame body 202, and seed collection bins 230, 264, may be kept low to the ground and, thus, under the majority of the plant branches. Referring to FIG. 2, this can be accomplished by adjusting the height $H_R$ of the rearward portion 206 of the frame body 202 relative to the wheel 214 and lowering the height $H_F$ of the forward portion 204 of the frame body via the attachment mechanism 500. Because the horizontal support member 312 is attached to the rearward portion 206 of the frame body 202 by the adjustable link 324, the attachment mechanism 500 may raise and lower the forward portion 204 relative to the rearward portion 206 while keeping the wheel 214 in contact with the ground 520. It is only when the attachment mechanism 500 raises the frame body 202 high enough to take up any slack in the adjustable link 324 that the entire frame body 202 will be raised off the ground 520.

As a result of keeping the frame body 202 low to the ground 520, when driven or otherwise moved through the center of the space between 40 inch rows of plants, where the plant branches have generally grown out to cover the space between the rows, the branches of a plants will overhang the frame body 202, and seed collection bins 230, 264 about 7.5 inches to about 12.5 inches.

As the seed collection assembly 200 is driven or otherwise moved between the plant rows 600, the first angled side rail 256 and the second angled side rail 258 at the forward portion 204 create a wedge that contacts low hanging plant branches to agitate the plant and dislodge seeds. The angled surface of the first angled side rail 256 and the second angled side rail 258, however, diverts the branches around the first and second side rails 210, 212 of the frame body 202 such that little, if any, damage is done to the plant. The upward extending projections 270, 272 at the forward portion 204 of the frame body 202 also contact plant branches to agitate the plant and dislodge seeds. The rearward sloping orientation of the projections 270, 272, however, result in substantially no damage to the plant. Seeds dislodged by the forward portion 204 and the upward extending projections 270, 272 may fall by gravity into the collection pin 230, 264 in the forward portion.

In addition, as the seed collection assembly 200 is driven or otherwise moved between the plant rows 600, upper branches of the plant are contacted by the downward extending plurality of projections 290 to further agitate the plant and dislodge seeds. The rearward sloping orientation and the flexible nature of the projections 290, however, result in little, if any, damage to the plant. Seeds dislodged by the downward extending plurality of projections 290 may fall by gravity into the collection bins 230 in the frame body 202.

As shown in FIG. 1, multiple seed collection assemblies 200 may be arranged in parallel such that the seed harvester 100 can dislodge seeds from multiple plant rows 600 at a time. When seed collection is completed or the collections bins 230, 264 need to be emptied, the seed harvester 100 may raise the seed collection assemblies 200 off the ground 520 via the attachment mechanism 500 and proceed to an area outside of the plant rows to offload the collected seeds. Alternatively, the collection bins may be emptied while the harvester is still located within the plant rows; such emptying may be aided by having removable collection bins.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative compositions and processes, and illustrative examples shown and described. Accordingly, departures may be made from such details without departing from the spirit or scope of the general inventive concept.

The invention claimed is:

1. A harvester for removing and collecting seed from plants, comprising:
one or more seed collection assemblies, each seed collection assembly comprising:
a frame body extending between a forward portion and a rearward portion along a longitudinal axis;
at least one seed collection bin supported by the frame body;
a support structure having a first end pivotally attached to the frame body such that the frame body and support structure do not pivot more than 90 degrees in a side-to-side or upward and downward direction, and a second end distal from the frame body; and at least one set of a plurality of fixed projections for contacting branches to dislodge seeds, each set of the plurality of projections attached to the second end of the support structure at an attachment point, and extending downward toward the frame body and rearward toward the rearward portion of the frame body, the plurality of fixed projections in each set fanning out while extending outward from the attachment point;

wherein the at least one seed collection bin is positioned to receive dislodged seed that fall downward by gravity.

2. The harvester of claim 1, wherein the at least one seed collection bin is removably supported by the frame body.

3. The harvester of claim 1, further comprising at least one wheel rotatably mounted to the rearward portion of the frame body.

4. The harvester of claim 1, wherein each set of the plurality of fixed projections is attached to the support structure at a separate attachment point.

5. The harvester of claim 1, wherein at least two sets of the plurality of fixed projections are present.

6. The harvester of claim 1, wherein the plurality of fixed projections are flexible.

7. The harvester of claim 5, wherein the at least two sets of the plurality of fixed projections include a first set of projections and a second set of projections, wherein the first set of projections extend on an opposite side of the support structure than the second set of projections.

8. The harvester of claim 1, wherein each seed collection assembly further comprises one or more additional projections extending from the forward portion of the frame body, the additional projections for contacting the branches to dislodge seeds, each additional projection attached to the forward portion of the frame body and extending upward away from the frame body and toward the rearward portion of the frame body.

9. The harvester of claim 1, wherein the support structure comprises a vertical support member attached to the frame body and a horizontal support member spaced apart from the frame body and extending from the forward portion to the rearward portion.

10. The harvester of claim 9, wherein the horizontal support member is attached to the rearward portion of the frame body by an adjustable link.

11. The harvester of claim 1, wherein each of the one or more seed collection assemblies further comprises an attachment for connection to a motor vehicle to move the one or more seed collection assemblies adjacent to the plants.

12. The harvester of claim 1, wherein the one or more seed collection assemblies includes three to nine seed collections assemblies arranged and attached to the motorized vehicle in parallel to each other.

13. The harvester of claim 1, wherein the frame body is pivotable with respect to the support structure in at least side-to-side and upward-downward directions.

14. The harvester of claim 1, wherein the plants comprise guayule shrubs.

15. A method of removing and collecting seed from a guayule plant, comprising:
contacting the plant with the harvester of claim 8, wherein the at least one additional projection and at least one set of the plurality of fixed projections dislodge seeds from the plant; and
positioning a seed collection bin under at least a portion of the plant to collect dislodged seeds.

16. The method of claim 15, wherein the at least one additional projection, the at least one set of the plurality of fixed projections, and the seed collection bin are part of a movable seed collection assembly that agitates the plant when moved into contact with the plant.

17. A method of removing and collection seed from a guayule plant, comprising: contacting the guayule plant with the harvester of claim 1, wherein the plurality of fixed projections dislodge seeds from the guayule plant; and the at least one seed collection bin is positioned to receive dislodged seeds.

18. A harvester for removing and collecting seed from guayule plants, comprising:
one or more seed collection assemblies, each seed collection assembly comprising:
a frame body extending between a forward portion and a rearward portion along a longitudinal axis;
at least one seed collection bin removably supported by the frame body;
a support structure having a first end pivotally attached to the frame body and a second end distal from the frame body such that the frame body and support structure do not pivot more than 90 degrees in a side-to-side or upward and downward direction;
at least one set of a plurality of fixed projections for contacting the branches to dislodge seeds, each set of the plurality of projections attached to the second end of the support structure at an attachment point, and extending downward toward the frame body and rearward toward the rearward portion of the frame body, the plurality of fixed projections fanning out as they extend outward from the attachment point;
at least one wheel assembly rotatably mounted to the rearward portion of the frame body; wherein the at least one seed collection bin is positioned to receive dislodged seed that fall downward by gravity.

19. The harvester of claim 18, wherein the plurality of fixed projections are flexible.

* * * * *